Oct. 12, 1948.  F. C. EASTMAN  2,450,944
DITHERING VALVE
Filed Oct. 12, 1944
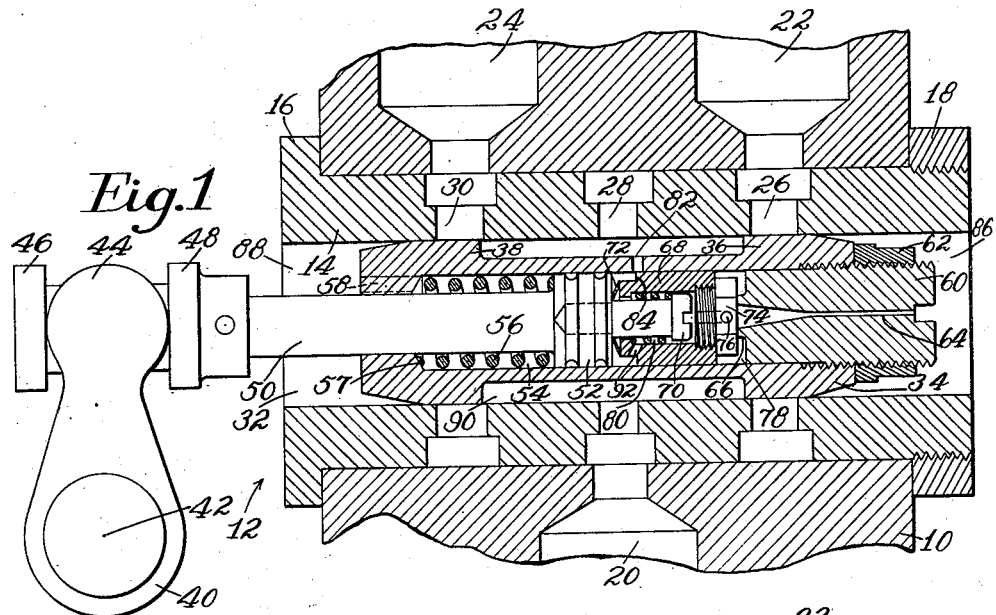
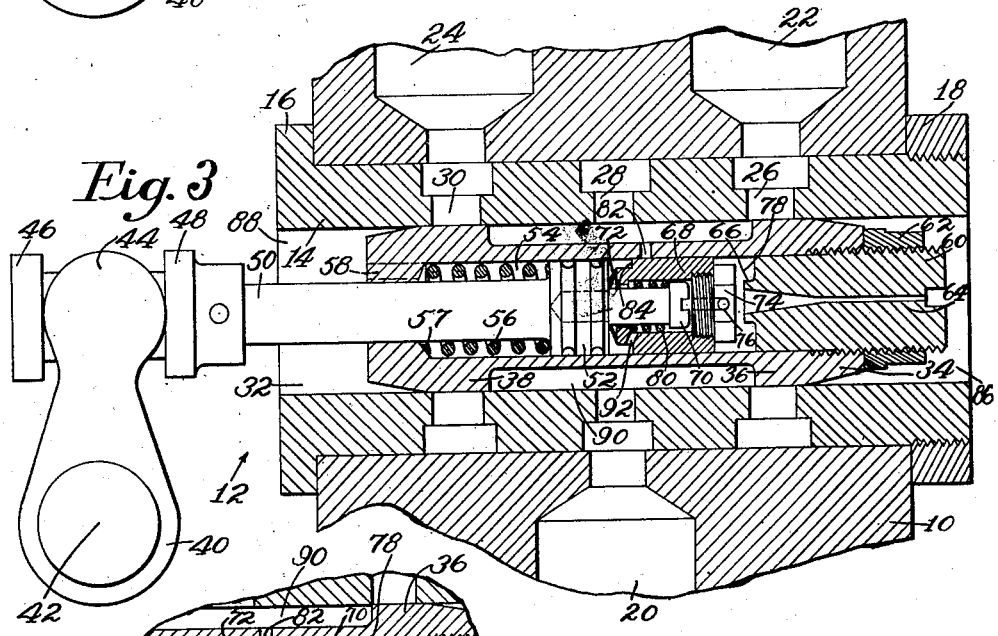
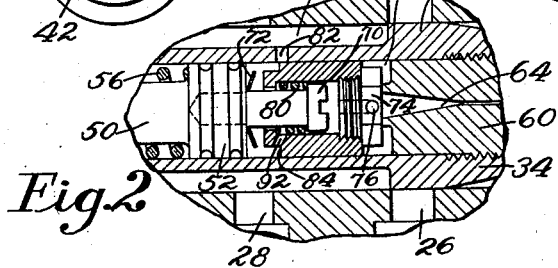
Inventor
Fred C. Eastman
By his Attorney Patented Oct. 12, 1948

2,450,944

UNITED STATES PATENT OFFICE 2,450,944

DITHERING VALVE

Fred C. Eastman, Marblehead, Mass., assignor to United Shoe Machinery Corporation, Flemington, N. J., a corporation of New Jersey Application October 12, 1944, Serial No. 558,354

11 Claims. (Cl. 137—139)

This invention relates to a valve assembly for controlling the passage of fluids, the free actuation of the valve being due at least in part to elimination of static friction.

An object of this invention is to provide a valve having fluid pressure operated means compactly associated therewith for dithering the valve to free it from static friction and such other resistance to movement that may exist and thereby promote a sensitive control of the valve.

Another object of the invention is to provide a dithering valve which will not stall or hesitate in its dithering but will reciprocate rapidly and constantly with a snap action.

Where a fluid power medium is to be delivered by a valve to a device such as a power cylinder having a double acting reciprocating piston therein, for example, the valve is constructed ordinarily with one intermediate fluid inlet port, two spaced control ports and two discharge ports. The inlet port is connected to some source of pressure fluid. One of the two control ports is connected to one end of the power cylinder and the other control port is connected to the other end of the power cylinder. One discharge port is located at each end of the valve and each discharge port is provided with connections for leading the discharge fluid back to its source. Thus, as the valve is moved within its range of travel the pressure fluid is delivered from its source through the inlet port and out one of the control ports to one end of the power cylinder, causing the piston to change its position and thereby effect some desired operation such as the placing of a gun in a selected position of azimuth or elevation. Pressure fluid is discharged from the other end of the power cylinder and passes through the other control port and a discharge port of the valve back to the fluid supply source. The rate of movement of the piston will depend upon the extent to which the control ports are open and if the control ports are closed the piston will remain stationary. In such a valve considerable static friction and other resistance to movement must be overcome in opening or closing the valve and, if such friction or resistance to valve operation is not eliminated, the actuation of the valve must needs be erratic.

In accordance with this invention resistance to valve actuation is eliminated for all practical purposes by vibrating or dithering the main valve element by means of a reciprocating element within the valve element, the reciprocation being due to fluid pressure exerted on the reciprocating element. In the illustrated construction resilient means are preferably provided for insuring a steady and reliable reciprocation of the valve member as well as for cushioning the reciprocating action.

These and other important features of the invention, including various novel details of construction and combinations of parts will now be described in detail in the specification and then pointed out more particularly in the appended claims.

In the drawings,

Fig. 1 shows a sectional view of a valve illustrating one embodiment of the invention, with the valve parts in the positions they assume at the beginning of what may be called the dithering cycle;

Fig. 2 is a sectional view of a portion of the valve structure shown in Fig. 1 with the parts in positions assumed further along in the dithering cycle; and Fig. 3 is a sectional view similar to Fig. 1 with the parts in still another position preliminary to return to the positions shown in Fig. 1.

As shown in Figs. 1 and 3 a support 10 is provided for the valve broadly indicated by the numeral 12. The valve constitutes a sleeve member or valve body 14 held in place on the support 10 by a shoulder 16 and a nut 18. A fluid pressure inlet 20 is formed in the support 10 and is adapted to lead pressure fluid from some convenient source of supply to the valve where the pressure fluid is controlled to operate some exterior device not shown in the drawings. In the event that the valve is to control the passage of pressure fluid to a cylinder for changing the position of a gun in elevation the support 10 will be provided with two ports 22 and 24. Port 22 would lead to one end of the power cylinder to move the gun in one direction while port 24 would be serving as an exhaust passage for the fluid from the other end of the power cylinder. If the gun were to be lowered then port 24 would lead pressure fluid to the other end of the cylinder and port 22 would serve as the exhaust port from the power cylinder. The sleeve 14 is provided with three sets of annular ports 26, 28 and 30. Annular ports 28 are in alinement with inlet port 20. Annular ports 26 are in alinement with port 22 and annular ports 30 are in alinement with port 24. The sleeve or valve body 14 is provided with a cylindrical chamber 32 having a valve member 34 snugly fitted therein for reciprocation relative thereto. The valve member 34 has lands 36 and 38 alined with the ports 26 and 30 respectively. A cam-like member 40 is affixed to a shaft with a center 42 for rotation therewith by the operator in the actuation of the valve. Circular ears or portions 44 of the camlike member 40 are interposed between two stops or shoulder members 46 and 48 on a control member or shaft 50 which shaft has affixed thereto a piston 52. The piston 52 is provided with suitable rings or packing to eliminate leakage and is enclosed within a chamber 54 within the valve member 34. A spring 56 is compressed between the piston 52 and the end portion 57 of the valve member 34 encompassing the control member 50. A passage 58 is formed between the chamber 54 and through portion 56 to insure that there will be no build up of fluid pressure around the spring 56. At the other end of the valve member 34 a plug 60 is suitably located to close up the end of the chamber 54 and is held in place with a lock nut 62. Plug 60 is provided with an exhaust passage 64 and a boss 66 surrounds the interior end of the passage 64. Between the boss 66 and the piston 52 is mounted a slide valve 68 which snugly fits within the passage 54 for reciprocation relative thereto. A stud or stop element 70 is utilized to hold the slide valve 68 loosely to the piston 52, that is, with a limited freedom of motion determined at one end by the head of the stud 70 and spring 80 and at the other end by the abutment of the slide valve 68 against the piston 52 or the spring washer member 72 interposed between the slide valve 68 and the piston 52. A screw 74 with a large head having a right angled passage 76 therein is affixed in the end of slide valve 68 and alined with the stud 70. The proportions are such that an annular chamber 78 surrounds the boss 66 and the head of the screw 74. The coil spring or resilient means 80 is mounted about the stud 70 in such a way as to tend to move the slide valve 68 to the left, as viewed in Fig. 1. An inlet passage through slide valve 68 is supplied with fluid by a port 82, which port is located in the intermediate thin portion or wall of the valve member 34 in position to be controlled by shoulder 84 on the slide valve 68. The ends of the sleeve or valve body 14 constitute discharge ports 86 and 88 which may be connected by means (not shown) leading back to the source of supply of the pressure fluid.

In the operation of the device the valve member 34 is arranged to vibrate or dither regardless of the position in which it is placed by the operator with relation to the ports 26 and 30. Assuming that Fig. 1 shows the beginning of a cycle of vibration or dithering, the faces on the slide valve are such that pressure fluid from the port 20 will enter the annular ports 28 and pass into the cylindrical chamber 90 and then pass through the port 82 into the cavity between piston 52 and plug 60 as passages 92 and 76 allow an unrestricted flow of fluid into space 78. As piston 52 is held stationary by cam member 40, pressure against the face of plug 60 will cause plug 60 and valve member 34 to move to the right. Due to the unbalanced pressure on slide valve 68 caused by the shielding area of boss 66, slide valve 68 will tend to move to the right with valve member 34 compressing springs 56 and 80. When spring 80 becomes loaded to a point just above the force caused by the unbalanced area of boss 66 (a condition being approached in Fig. 2), slide valve 68 will be snapped away from contact with boss 66, opening exhaust port 64 and closing the port 82, as in Fig. 3. Thus, with the pressure within the cavity between piston 52 and plug 60 released, the entrapped fluid is free to be forced out through exhaust port 64 by spring 56 pushing valve member 34 toward the left. Slide valve 68 resting on spring washer 72 is held stationary by spring 80 and continued movement of valve member 34 to the left causes the exhaust port 64 to be closed and the feed port 82 to open, as shown in Fig. 1, the starting position of the next cycle. It can thus be seen that the compression of spring 56 is intermittently overcome by the fluid pressure operated means located within the valve member 34 itself.

Plate spring or spring washer member 72 is not essential but its use is preferable because it not only functions as a shock absorber between piston 52 and slide valve 68 but it also aids in snapping the slide valve 68 to the right at the proper time. With such springs as springs 72 and 80 the likelihood of stalling is prevented, the dithering is positive and the action of the slide valve 68 is cushioned at both ends of its travel.

Having described by invention, what I claim as new and desire to secure by Letters Patent of the United States is:

1. A valve comprising a valve body having a chamber with an intermediate fluid inlet port and two spaced ports, a valve member slidable in said chamber with lands arranged to control fluid flow from the inlet port to the two spaced ports, a control member projecting from one end of the chamber, and means within the valve member responsive to fluid pressure from the inlet port to effect vibration of the valve member with relation to the control member.

2. A valve comprising a valve body, a chamber within the body, a longitudinal slidable valve member closely fitting the chamber and having valve lands associated with appropriate ports in the valve body, a control member projecting from one end of the chamber and including a piston within said valve member and slidable relative thereto, a slide valve loosely connected to the piston and adapted for reciprocation within the valve member, a spring compressed between the piston and the valve member tending to move the valve member in one direction, a passage for pressure fluid leading from an intermediate portion of the valve body into the valve member and through the slide valve to a chamber adjoining the slide valve, said passage being arranged to be cut off by the slide valve during the movement of the valve member in said one direction, an exhaust passage through an end of the valve member and adapted to be cut off by the movement of the slide valve in the other direction during its reciprocation, and spring means tending to move the slide valve in said other direction.

3. A valve for the sensitive control of pressure fluid passing therethrough comprising a control member projecting into said valve, a valve member mounted for reciprocation with relation to said control member and in position to regulate the said passage of fluid with its actuation by the control member, and means within the said reciprocatory valve member for effecting said reciprocation.

4. A valve for the sensitive control of pressure fluid passing therethrough comprising a control member projecting into said valve, a valve member mounted for reciprocation upon said control member and in position to regulate said passage of fluid with its actuation by the control member, spring means within said valve tending to move the valve member in one direction with relation to the control member, and means operated by the pressure of fluid passing through the valve tending intermittently to counteract the action of the said spring means to effect vibration of the valve member with relation to the control member.

5. A valve comprising a valve body having an elongated chamber with an intermediate fluid inlet port, two spaced control ports and two exhaust ports, a vibratory valve member slidable in said chamber with lands arranged to control fluid flow from the inlet port to either of the two control ports and from the other control port to one of the exhaust ports, a control member projecting from one end of the elongated chamber, and means within the vibratory valve member responsive to fluid pressure from the inlet port to effect vibration of the valve member with relation to the control member.

6. A valve for the sensitive control of a main pressure fluid flow passing therethrough comprising a control member projecting into said valve, a valve member mounted for reciprocation upon said control member and in position to regulate the said main passage of fluid with its actuation by the control member, a restricted passage through said valve member for pressure fluid, spring means tending to move the valve member in one direction with relation to the control member, and a fluid pressure operated slide valve mounted within the valve member for reciprocation with respect to the control member and the valve member, the range of said slide valve reciprocation being limited by stop means attached to the control member, a surface of said slide valve and the said restricted passage being so arranged relatively as to cause said surface intermittently to cut off said passage permitting said spring means to act intermittently to move the slide valve member in the other direction to effect the said reciprocation of the valve member.

7. A valve for the sensitive control of pressure fluid passing therethrough comprising a control member projecting into said valve, a valve member mounted for reciprocation upon said control member and in position to regulate the said passage of fluid with its actuation by the control member, and fluid pressure operated means within the valve member for effecting said reciprocation, said fluid pressure operated means having an exhaust passage through an end of the valve member.

8. A valve for the sensitive control of pressure fluid passing therethrough comprising a control member projecting into said valve, a valve member mounted for reciprocation upon said control member and in position to regulate said passage of fluid with actuation by the control member, spring means within the valve member for effecting movement in one direction of the valve member on the control member, and means operated by the pressure of fluid passing through the valve tending to move the valve member in the other direction intermittently, said fluid pressure operated means being provided with spring means for cushioning its action.

9. A valve according to claim 8, the spring means of the fluid pressure operated means including one spring to cushion the movement of the said means in one direction and a second spring to cushion the movement of the said means in the other direction.

10. A valve comprising a valve body, a chamber within the body, a longitudinally slidable valve member closely fitting the chamber and having valve lands associated with appropriate ports in the valve body for passage of fluid to be regulated by the valve, a control member projecting from one end of the chamber and including a piston within said valve member, a slide valve arranged for reciprocation within the valve member, means limiting the range of movement of the slide valve from the piston, a spring compressed between the piston and the valve member tending to move the valve member in one direction, an inlet passage for pressure fluid leading from an intermediate portion of the valve body into the valve member and through the slide valve to an annular chamber adjoining the slide valve, said inlet passage being arranged to be cut off by the slide valve during movement of the slide valve with the valve member in said one direction, an exhaust passage through an end of the valve member and adapted to be opened by the slide valve upon said latter movement of the slide valve, and resilient means for aiding the movement of the slide valve to open the exhaust passage, the arrangement being such that further movement of the valve member in said one direction will serve to open the inlet passage and close the exhaust passage.

11. A valve comprising a valve body, a chamber within the body, a longitudinally slidable valve member closely fitting the chamber and having valve lands associated with appropriate ports in the valve body for passage of fluid to be regulated by the valve, a control member projecting from the chamber and including a piston within said valve member, a slide valve within the valve member arranged for a limited range of reciprocation from the piston, a spring tending to move the valve member in one direction relative to the piston, and means for intermittently overcoming said tendency by reciprocating the slide valve comprising pressure fluid passages from an intermediate portion of said valve body through said valve member, slide valve and an annular chamber adjoining the slide valve and out an end of the valve member together with faces on said slide valve to control said passages.

FRED C. EASTMAN.

REFERENCES CITED

The following references are of record in the file of this patent:

UNITED STATES PATENTS

| Number | Name | Date |
|---|---|---|
| 1,512,804 | Roucka | Oct. 21, 1924 |
| 1,709,689 | Staege | Apr. 16, 1929 |
| 2,124,274 | Nichols | July 19, 1938 |
| 2,304,784 | Donaldson | Dec. 15, 1942 |
| 2,339,001 | Clay | Jan. 11, 1944 |
| 2,347,368 | Rosen | Apr. 25, 1944 |

FOREIGN PATENTS

| Number | Country | Date |
|---|---|---|
| 440,342 | Great Britain | Dec. 20, 1935 |